No. 717,719. PATENTED JAN. 6, 1903.
J. SCHMIDT, Jr.
SAW.
APPLICATION FILED FEB. 20, 1901.
NO MODEL. 2 SHEETS—SHEET 1.
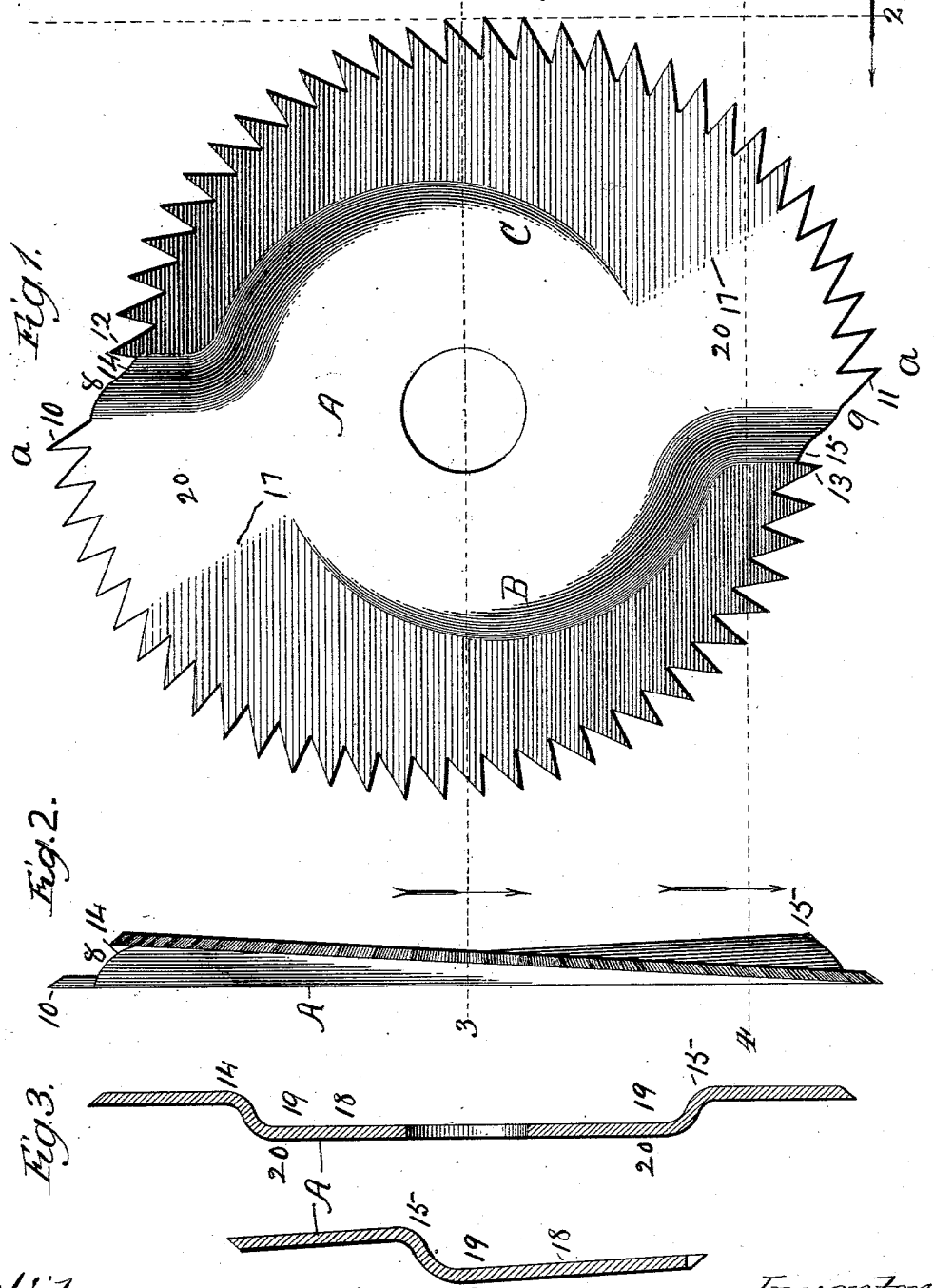

No. 717,719. PATENTED JAN. 6, 1903.
J. SCHMIDT, Jr.
SAW.
APPLICATION FILED FEB. 20, 1901.
NO MODEL. 2 SHEETS—SHEET 2.
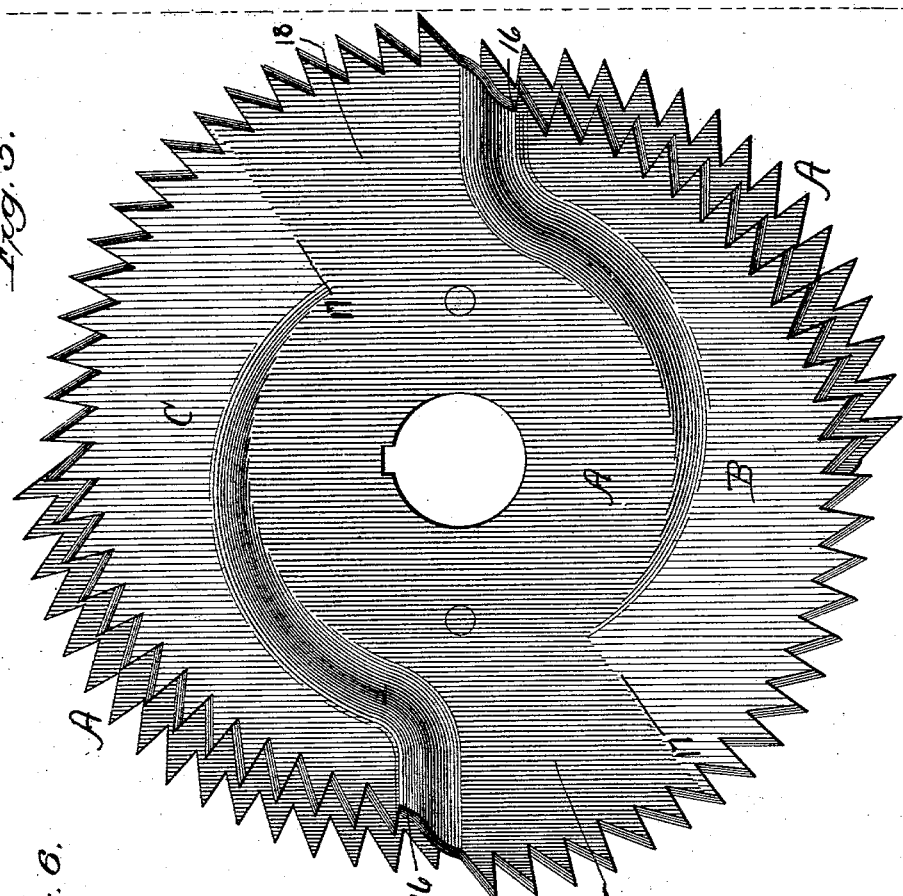
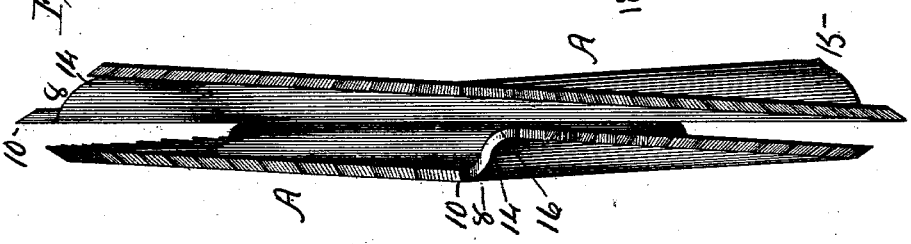
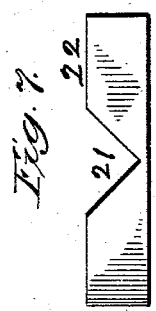
Witnesses:
Inventor:
Joseph Schmidt Jr.
By L. B. Coupland & Co
Att'ys.

UNITED STATES PATENT OFFICE.

JOSEPH SCHMIDT, JR., OF CHICAGO, ILLINOIS, ASSIGNOR TO JOHN L. FLANNERY, OF CHICAGO, ILLINOIS.

SAW.

SPECIFICATION forming part of Letters Patent No. 717,719, dated January 6, 1903.

Application filed February 20, 1901. Serial No. 48,053. (No model.)

*To all whom it may concern:*

Be it known that I, JOSEPH SCHMIDT, Jr., a citizen of the United States, residing at Chicago, in the county of Cook and State of Illinois, have invented a certain new and useful Improvement in Saws; and I do hereby declare the following to be a full, clear, and exact description of the invention, such as will enable others skilled in the art to which it appertains to make and use the same.

This invention relates to saws of the circular type, and has for its object to provide a device of this character possessing certain peculiar features whereby miter grooves or kerfs may be cut in objects, such as boards and the like, with facility. This form of a saw is more especially intended for cutting V-shaped grooves or scores in board-blanks to permit of the sections between the grooves being readily bent around at right angles with reference to each other without separation in forming the respective sides of a box-frame.

The large and increasing commercial demand for packing and shipping boxes and like receptacles and the active competition to be met with in the market requires the employment of means that will greatly facilitate and cheapen the production of this class of articles in every step and detail from the first operation to final completion. In the process of cutting a complete corner or miter groove at one operation two companion saws are placed together, forming a pair. As many pairs may be used as there are grooves to be cut in the blank, and are usually mounted on the same shaft and positioned with reference to the distance to be observed between the grooves indicating the corner-joints of the box structure.

In the accompanying drawings, Figure 1 is a side elevation of a saw embodying the improved features. Fig. 2 is an edge elevation looking from line 2, Fig. 1, as indicated by the arrow. Fig. 3 is a transverse section on line 3, Fig. 1. Fig. 4 is a section on line 4, Figs. 1 and 2. Fig. 5 is an elevation of the relative position of the saws when mounted in pairs. Fig. 6 is an edge view of the same, and Fig. 7 shows a piece of blank box stuff having a groove formed therein.

A A represent the companion saw-plates, forming a pair, and which are pressed into shape to bring the teeth or cutting edge into a plane diagonally with reference to the axis of motion, as shown in Figs. 2 and 6.

The detailed description of one saw as to form and structure will answer for both.

The saw consists of what may be termed two "integral semisections" B and C, the teeth being divided into two sets by the blank spaces 8 and 9, in which there are no teeth. These spaces are diametrically opposite each other and give the saw-plate a mutilated appearance. The saw-plate is also eccentric in that it is of a greater diameter on a line drawn from *a* to *a* than on line 3, as shown in Fig. 1. Thus the point of the first or highest tooth 10 of section B and the corresponding tooth 11 in the companion section C are farther from the center of axis than the last or lower teeth 12 and 13 of the respective sections. This change of conditions is gradual and uniform from the highest tooth to the lowest tooth and brings the first and last tooth of each section into different planes and the relative position shown in Fig. 9. The integral saw-sections are provided on the same side of the plate with raised flat segmental ridges 14 and 15, which follow a larger part of the cutting edge, as shown more fully in Fig. 5. The highest points 16 of these ridges are located opposite each other and gradually slope and grow less in height until the vanishing-point 17 is reached, leaving a flat surface 18 between the vanishing-point of one ridge and the highest point of the companion ridge. The central portion 19 of the plate on the same side has the appearance of being dished or depressed and presents a comparatively flat surface. The opposite side of the plate presents the raised flat surface 20 between the shaded surfaces of the two sections, as shown in Figs. 1 and 3. The diagonal trend of the cutting edge follows that of a slight curve the degree of which will be in accordance with the intended width and slope of the groove walls or sides. This form of a saw will at the same time make a clean cut and leave a perfectly smooth surface, so that when the sloping sides of the groove are brought together a close tight joint will be formed.

Another feature is that of providing a circular saw having a variable diameter. It will be noted that the shaded surfaces in Fig. 1 gradually grow narrower in width between the cutting edge and the ridges. The widest space is in line with the initial tooth of each section and the narrowest space in line with the last tooth in each section and adjacent to the highest part of the division-ridges, so that the cutting point of each tooth in advance is brought a little nearer to the center of axis until the last tooth is reached, which is much nearer the axial center than the first tooth on the higher side of each section. This imparts an eccentric action and provides for a graduated smooth cut and free clearance of the cut-out matter, and the possibility of clogging is also prevented.

In cutting the groove 21 in the piece of material 22, Fig. 7, and sloping both sides at one operation two saws are used and are rigidly secured together, as shown in Figs. 5 and 6. The high or flat sides of the saws (shown in Fig. 1) are faced together, but are set so that the ridges of one saw are at right angles with reference to the corresponding parts on the companion saw-plate. By this arrangement the teeth on the wider part of one saw project beyond the teeth on the narrower part, as shown in Fig. 5, and provides for a continuous cutting operation, and the teeth of one saw are prevented from contacting or interfering with the teeth of the companion saw in cutting a miter groove at one operation with the work lying flat in a horizontal position. The space between the companion saws also makes provision for the escape of the sawdust. This form of a saw is set square on its axial shaft and not mounted at an oblique angle, or "out of true," as are the saws of the "wabble" type.

Having thus described my invention, what I claim, and desire to secure by Letters Patent, is—

1. The combination with a circular saw, having its cutting edge divided into integral semisections, the teeth of the companion sections lying in different planes and separated by blank spaces located opposite each other, of a companion saw, secured to the first saw and positioned with reference thereto, so as to bring the blank spaces in the cutting edge of one saw at right angles to the same spaces in the other saw, substantially as described.

2. The combination with a circular saw, having its cutting edge divided into integral semisections, the teeth of the two sections being set in different planes curving diagonally with reference to the axis of motion, each section being provided with a gradually-raised ridge having a high and a low point, of a companion saw, secured to the first saw and having the high part of the ridge-surfaces of the companion saws set at right angles with reference to each other, substantially as described.

In testimony whereof I affix my signature in presence of two witnesses.

JOSEPH SCHMIDT, JR.

Witnesses:
 L. M. FREEMAN,
 L. B. COUPLAND.